(12) United States Patent
Shogome

(10) Patent No.: US 12,487,661 B2
(45) Date of Patent: Dec. 2, 2025

(54) INFORMATION PROCESSING APPARATUS AND INFORMATION PROCESSING METHOD

(71) Applicant: CANON KABUSHIKI KAISHA, Tokyo (JP)

(72) Inventor: Kohei Shogome, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/659,414

(22) Filed: May 9, 2024

(65) Prior Publication Data
US 2024/0385682 A1 Nov. 21, 2024

(30) Foreign Application Priority Data
May 16, 2023 (JP) ................ 2023-080782

(51) Int. Cl.
| | |
|---|---|
| G06F 3/01 | (2006.01) |
| G06F 3/0346 | (2013.01) |
| H04N 13/106 | (2018.01) |
| H04N 13/117 | (2018.01) |
| H04N 13/279 | (2018.01) |
| H04N 13/296 | (2018.01) |
| H04N 13/332 | (2018.01) |
| H04N 13/366 | (2018.01) |
| H04N 13/156 | (2018.01) |

(52) U.S. Cl.
CPC ............ *G06F 3/011* (2013.01); *G06F 3/0346* (2013.01); *H04N 13/106* (2018.05); *H04N 13/279* (2018.05); *H04N 13/366* (2018.05); *H04N 13/117* (2018.05); *H04N 13/156* (2018.05); *H04N 13/296* (2018.05); *H04N 13/332* (2018.05)

(58) Field of Classification Search
CPC ..... G06F 3/011; G06F 3/0346; H04N 13/279; H04N 13/366; H04N 13/204; H04N 13/106; H04N 13/156; H04N 13/296; H04N 13/332; H04N 13/117; H04N 13/20
See application file for complete search history.

(56) References Cited

U.S. PATENT DOCUMENTS

2023/0206546 A1 6/2023 Niiyama
2024/0267611 A1* 8/2024 Speasl .................. H04N 23/62

FOREIGN PATENT DOCUMENTS

| JP | 2004080205 A | * 3/2004 |
|---|---|---|
| JP | 2016-081408 A | 5/2016 |
| JP | 2020-119334 A | 8/2020 |
| JP | 2022-041258 A | 3/2022 |

* cited by examiner

*Primary Examiner* — Douglas Wilson
(74) *Attorney, Agent, or Firm* — Venable LLP

(57) ABSTRACT

An information processing apparatus captures an image of virtual space in which a virtual object corresponding to a first image capture apparatus that captures an image of reality space is disposed. The information processing apparatus obtains a machine-type parameter and an image capture parameter of the first image capture apparatus. The information processing apparatus obtains operation information regarding an operation performed on the first image capture apparatus by a user. The information processing apparatus generates a captured image in which the virtual space is captured from a position and an orientation of the virtual object in the virtual space, based on the machine-type parameter, the image capture parameter, and the operation information.

14 Claims, 9 Drawing Sheets

FIG. 4

| MAIN BODY MODEL NUMBER | LENS MODEL NUMBER |
|---|---|
| C-XXX | L-YYY |

FIG. 5

| APERTURE VALUE | SHUTTER SPEED | ISO SENSITIVITY |
|---|---|---|
| F4.0 | 1/1000 | 800 |

| EXPOSURE CORRECTION | FOCAL LENGTH | WB | IMAGE CAPTURE MODE |
|---|---|---|---|
| +1.0 | 50mm | AUTO | Manual |

FIG. 6

| OPERATION TYPE | VALUE |
|---|---|
| MENU BUTTON | On |

601

| OPERATION TYPE | VALUE |
|---|---|
| MAIN ELECTRIC DIAL | +3 |

602

| OPERATION TYPE | VALUE |
|---|---|
| TOUCH PANEL | MENU 3 |

603

| OPERATION TYPE | VALUE |
|---|---|
| ZOOM RING | -60 |

604

| OPERATION TYPE | VALUE |
|---|---|
| POSITIONAL ORIENTATION | X:0, Y:0, Z:160 / Y:0, P:0, R:0 |

605

INFORMATION PROCESSING APPARATUS AND INFORMATION PROCESSING METHOD

BACKGROUND OF THE INVENTION

Field of the Invention

The present invention relates to an information processing apparatus and an information processing method for realizing image capturing of virtual space.

Description of the Related Art

In recent years, research on VR (Virtual Reality) techniques has been progressing. With the progress of research on VR techniques, VR devices represented by HMDs (Head Mounted Displays) have become more widespread, and communication between a large number of users in VR virtual space has been actively conducted. A form of application for such communication in virtual space is called "metaverse".

In Metaverse virtual space (metaverse space), the user can communicate with another user using an avatar that is an icon of the user. As an example of communication activity, it is possible to perform image capturing in which an avatar in metaverse space serves as a subject.

A photograph in which metaverse space is captured can express optical properties (exposure, blurring, and the like) equivalent to an image of reality space, due to advanced 3D rendering techniques. In light of such circumstances, it is expected that users that are familiar with optical properties and have an excellent image capturing technique (a professional photographer, etc.) will enter a field of image capturing in metaverse space.

However, users originally familiar with operations of a VR application have learned image capturing techniques for VR space (methods for operating a VR controller, methods for setting image capture parameters, and the like), and thereby photography in metaverse space has developed. It is envisioned that an image capturing technique that a user has, the user being not used to operations of a VR application, will not match image capturing that uses a VR controller, hindering the user entering a field of image capturing of VR space.

In Japanese Patent Application Publication No. 2016-81408, a device other than a dedicated VR controller can be used as an HMD controller. In Japanese Patent Application Publication No. 2016-81408, a smartphone is used as a controller, but, by applying this technique to a camera, an image of virtual space can be captured using a device that the user is used to.

On the other hand, Japanese Patent Application Publication No. 2022-41258 states that, when a virtual camera corresponding to a terminal apparatus captures an image of virtual space, image capturing by the virtual camera may be realized in accordance with an operation performed on the terminal apparatus.

However, in the techniques of Japanese Patent Application Publication No. 2016-81408 and Japanese Patent Application Publication No. 2022-41258, there are many differences between image capturing in virtual space and image capturing in reality space, and the user cannot sufficiently use his or her image capturing technique developed in image capturing in reality space. For this reason, image capturing that is similar to image capturing in reality space cannot be realized in virtual space.

SUMMARY OF THE INVENTION

An object of the present invention is to realize, in virtual space, image capturing that is similar to image capturing in reality space.

An aspect of the present invention is an information processing apparatus that captures an image of virtual space in which a virtual object corresponding to a first image capture apparatus that captures an image of reality space is disposed, the information processing apparatus including at least one processor capable of causing the information processing apparatus to: obtain a machine-type parameter and an image capture parameter of the first image capture apparatus; obtain operation information regarding an operation performed on the first image capture apparatus by a user; and generate a captured image in which the virtual space is captured from a position and an orientation of the virtual object in the virtual space, based on the machine-type parameter, the image capture parameter, and the operation information.

An aspect of the present invention is an information processing method for capturing an image of virtual space in which a virtual object corresponding to a first image capture apparatus that captures an image of reality space is disposed, the method including: an obtaining step of obtaining a machine-type parameter and an image capture parameter of the first image capture apparatus; an operation information obtaining step of obtaining operation information regarding an operation performed on the first image capture apparatus by a user; and a generating step of generating a captured image in which the virtual space is captured from a position and an orientation of the virtual object in the virtual space, based on the machine-type parameter, the image capture parameter, and the operation information.

Further features of the present invention will become apparent from the following description of exemplary embodiments with reference to the attached drawings.

BRIEF DESCRIPTION OF THE DRAWINGS

FIG. 2 is a diagram of hardware configurations of an information processing apparatus and the like;

FIG. 4 is a diagram showing a machine-type parameter;

FIG. 5 is a diagram showing image capture parameters;

FIG. 6 is a diagram showing image capture operation information;

DESCRIPTION OF THE EMBODIMENTS

Embodiments of the present invention will be described below with reference to the drawings. The present invention is not limited to the following embodiments, and all combinations of features described in the embodiments are not necessarily essential to solution in the present invention. Configurations in the embodiments may be corrected or changed as appropriate on the basis of specifications of an apparatus to which the present invention is applied, and various conditions (use condition, use environment, and the like). In addition, some of the embodiments to be described later may be combined and configured as appropriate.

First Embodiment

Figure 1:
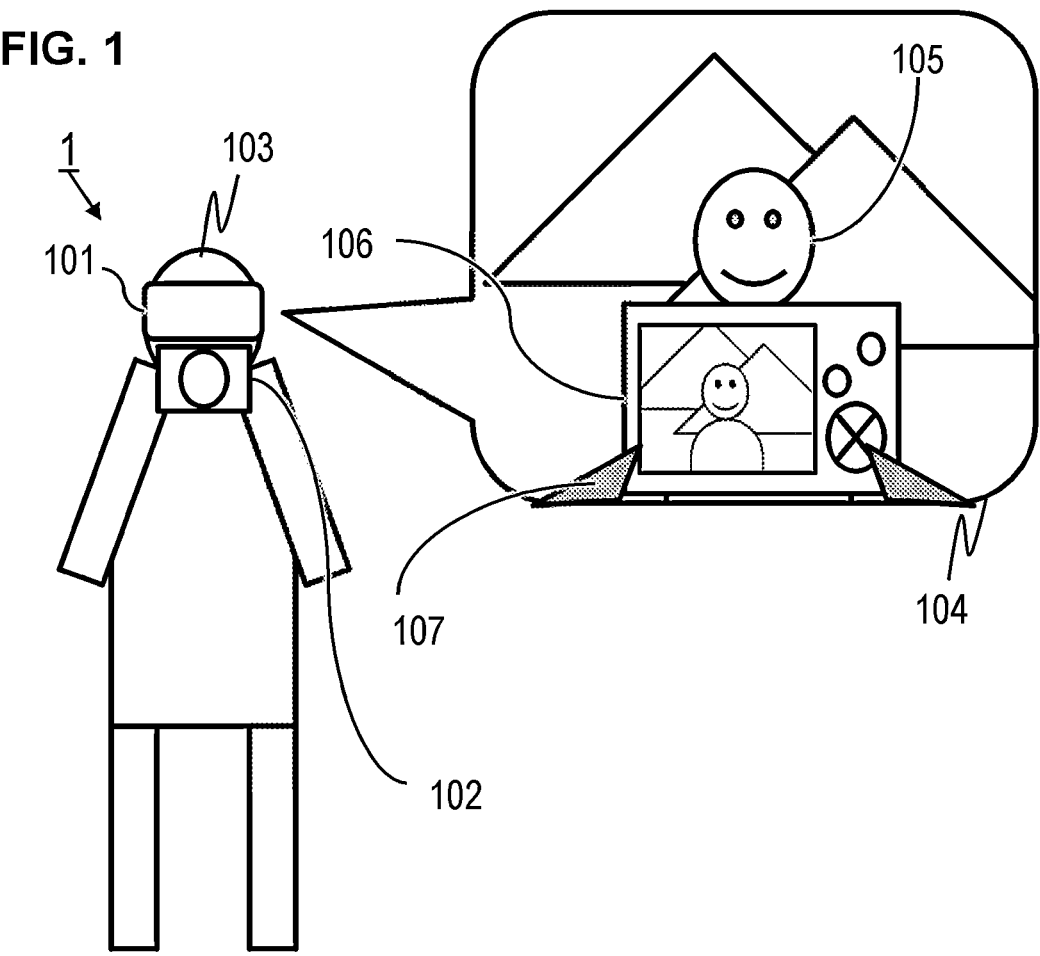
FIG. 1 is a diagram illustrating an image processing system.

FIG. 1 is a diagram illustrating an image processing system 1 according to a first embodiment. The image processing system 1 includes an information processing apparatus 101 and an image capture apparatus 102.

The information processing apparatus 101 is a head mounted display (HMD) that can be mounted to the head of a user. The image capture apparatus 102 is a camera device. The image capture apparatus 102 is a single-lens reflex camera, a mirrorless camera, a compact digital camera, an action camera (camera that realizes hands-free image capturing when mounted to the body of the user), a drone, or a smartphone, for example. Note that, when there is a need to decrease the size and the weight of the information processing apparatus 101, display-related units and processing-related units may be separated. Of these, the processing-related units may be disposed in a small-sized external box computer. A user 103 is a user that uses the image processing system 1.

A front portion of an avatar 105 of another user standing against a background of virtual space is displayed in an eyesight video image 104 that is being viewed by the user 103 wearing the information processing apparatus 101. In addition, a virtual object 106 (virtual object of the image capture apparatus 102) corresponding to the image capture apparatus 102 (the position, orientation, and appearance of the image capture apparatus 102) held in a hand of the user 103 in reality space is displayed in the eyesight video image 104. In a case where the information processing apparatus 101 is performing body tracking, the virtual object 106 is displayed along with a hand 107 of the avatar of the user without giving a feeling of strangeness, such that the user feels as if he or she is holding the image capture apparatus 102 in the virtual space.

The user 103 can change settings of "the virtual object 106 that is a camera for capturing an image of virtual space" by performing an operation on the real-life image capture apparatus 102. In addition, when the user 103 releases the shutter of the real-life image capture apparatus 102, the information processing apparatus 101 can obtain a still image (photograph) or a moving image of the virtual space based on the positional orientation (position and orientation) of the virtual object 106 and the content of the setting of the virtual object 106.

Figure 2:
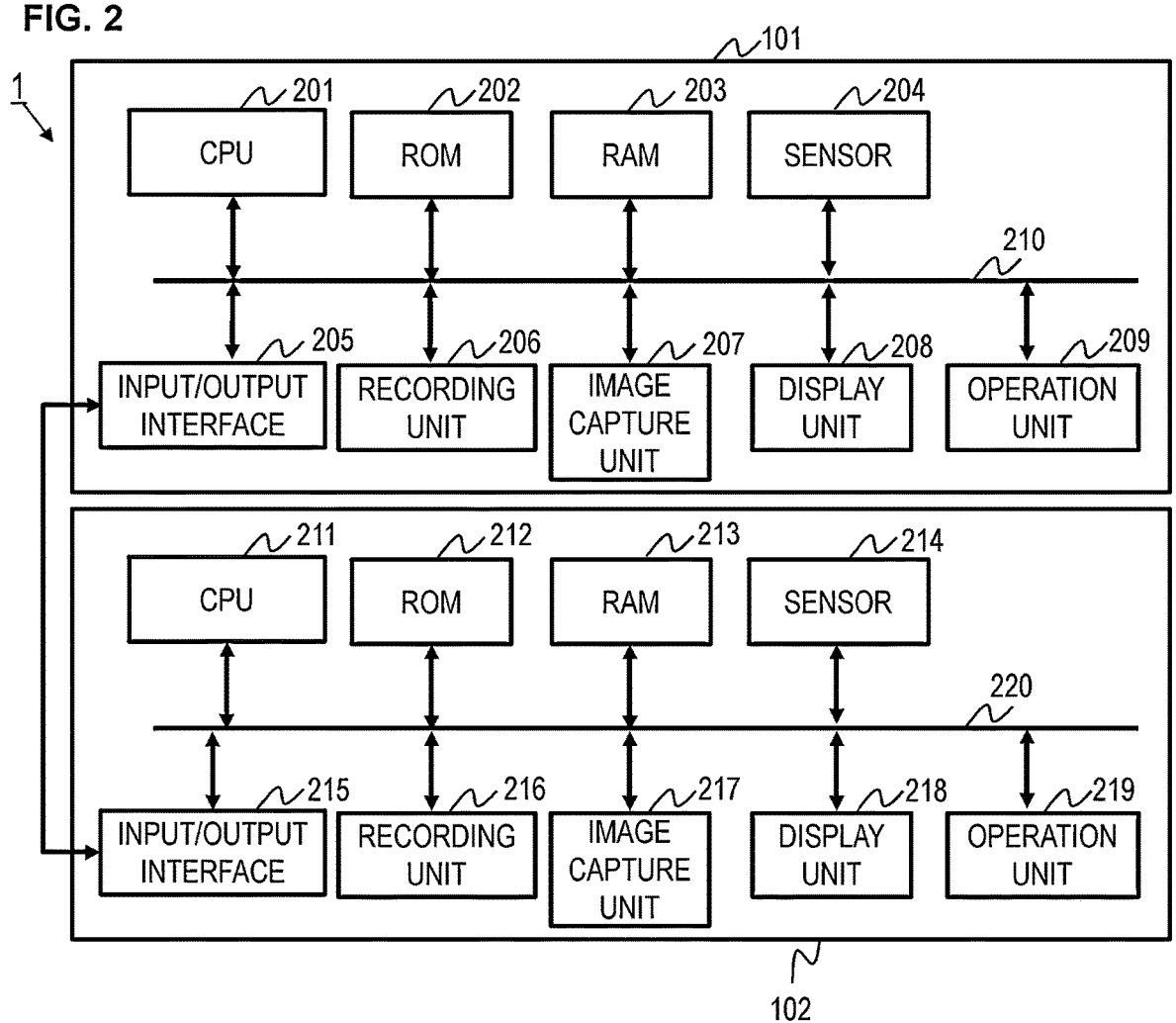

FIG. 2 is a diagram showing exemplary hardware configurations of the information processing apparatus 101 and the image capture apparatus 102.

The information processing apparatus 101 includes a CPU 201, a ROM 202, a RAM 203, a sensor 204, an input/output interface 205, a recording unit 206, an image capture unit 207, a display unit 208, an operation unit 209, and a bus 210. The hardware configurations of the information processing apparatus 101 can communicate with each other by being connected to the bus 210.

The CPU (Central Processing Unit) 201 is a system control unit that performs overall control of the information processing apparatus 101. In addition, the CPU 201 realizes information processing according to the first embodiment by executing an information processing program.

The ROM (Read Only Memory) 202 stores a basic program, initial data, and the like. The ROM 202 is a read-only memory that stores a program and parameters that do not need to be changed.

The RAM 203 (Random Access Memory) is a memory that temporarily stores input information, computation results (computation results of information processing and image processing), and the like.

The sensor 204 detects the positional orientation of the information processing apparatus 101. The sensor 204 includes sensing components such as a gyroscope and an IMU (Inertial Measurement Unit).

The input/output interface 205 can receive/output predetermined data. In the first embodiment, the predetermined data is transmitted from an input/output interface 215 of the image capture apparatus 102. The predetermined data is a machine-type parameter, image capture parameters, image capture operation information of the image capture apparatus 102, or the like. An input/output connection form provided by the input/output interface 205 may be a form for which local connection by USB, Bluetooth (registered trademark), or the like is used. An input/output connection form provided by the input/output interface 205 may also be a form for which internet connection by Ethernet or Wi-Fi (registered trademark) is used.

The recording unit 206 is a device capable of writing and reading various types of information. Specifically, the recording unit 206 is a member built in the information processing apparatus 101 or an external member attached thereto (a hard disk or a memory card), for example. Alternatively, the recording unit 206 is a member attachable/detachable to/from the information processing apparatus 101 (a memory card, a removable disk, an IC card, or the like). The information processing program that is executed by the CPU 201 is recorded in the recording unit 206. The information processing program is read out from the recording unit 206, is loaded to the RAM 203, and is executed by the CPU 201. Note that the information processing program may be stored in the ROM 202. In addition, predetermined data that is used for the information processing program that is executed by the CPU 201 can be recorded in the recording unit 206. A still image (photograph) and a moving image in which virtual space is captured are also recorded in the recording unit 206.

The image capture unit 207 is an image capture device that captures reality space. A live image (image of reality) in which reality space is captured is used for "tracking of a joint of a hand of a user or movement of a hand", "detection of a plane on which a virtual object such as a table is superimposed", and the like through image recognition. In the first embodiment, when the accuracy of positional orientation information of the image capture apparatus 102 obtained by a sensor 214 provided in the image capture apparatus 102 to be described later is insufficient, a result of tracking the image capture apparatus 102 through image recognition can be used for complementing the positional orientation information of the image capture apparatus 102.

The display unit 208 is an electronic display device. The display unit 208 is a stereo display that has display regions respectively corresponding to the two eyes of the user, for example.

The operation unit 209 accepts an operation performed on the information processing apparatus 101. An operating member of the operation unit 209 is a power supply button, a menu button, a select button, a submit button, or the like.

The image capture apparatus 102 includes a CPU 211, a ROM 212, a RAM 213, the sensor 214, the input/output interface 215, a recording unit 216, am image capture unit 217, a display unit 218, an operation unit 219, and a bus 220. The hardware configurations of the image capture apparatus 102 are connected to the bus 220, and communicate with each other.

The CPU 211 is a system control unit that performs overall control of the image capture apparatus 102. In addition, the CPU 211 realizes information processing according to the present embodiment by executing an information processing program.

The ROM 212 stores a basic program, initial data, and the like. The ROM 212 is a read-only memory that stores a program and parameters that do not need to be changed.

The RAM 213 is a memory that temporarily stores input information, computation results (computation results of information processing and image processing), and the like.

The sensor 214 detects positional orientation of the image capture apparatus 102. The sensor 214 includes a sensing component such as a gyroscope or an IMU. The image capture apparatus 102 can be used as a level (a device for checking the angle of an object relative to a horizontal or vertical line), for example.

The input/output interface 215 accepts input/output of predetermined data. The predetermined data is a machine-type parameter, image capture parameters, or image capture operation information of the image capture apparatus 102. An input/output connection form provided by the input/output interface 215 may be realized as any of local connection (connection using USB, Bluetooth, or the like) and internet connection (connection using Ethernet or Wi-Fi).

The recording unit 216 is a device capable of writing and reading various types of information. Specifically, the recording unit 216 is a member built in the image capture apparatus 102 or an external member attached thereto (a hard disk or a memory card). Alternatively, the recording unit 216 is a member attachable/detachable to/from the image capture apparatus 102 (a memory card, a removable disk, an IC card, or the like). The information processing program that is executed by the CPU 211 is recorded in the recording unit 216. The information processing program is read out from the recording unit 216, is loaded to the RAM 213, and is executed by the CPU 211. Note that the information processing program may also be stored in the ROM 212. In addition, predetermined data that is used for the information processing program that is executed by the CPU 211 can be recorded in the recording unit 216.

The image capture unit 217 is an image capture device that captures an image of reality space. The image capture unit 217 records, in the recording unit 216, a still image and a moving image of the reality space individually captured by the image capture apparatus 102.

The display unit 218 is an electronic display device. The display unit 218 is a live view display provided on the rear surface of the image capture apparatus 102 (a camera), for example.

The operation unit 219 accepts an operation performed on the image capture apparatus 102. An operating member of the operation unit 219 is a button, a dial, or a touch panel. An operating member of the operation unit 219 is a focus ring (a member for controlling focus), a zoom ring (a member for controlling zoom), an aperture ring (a member for controlling aperture), or the like.

Figure 3:
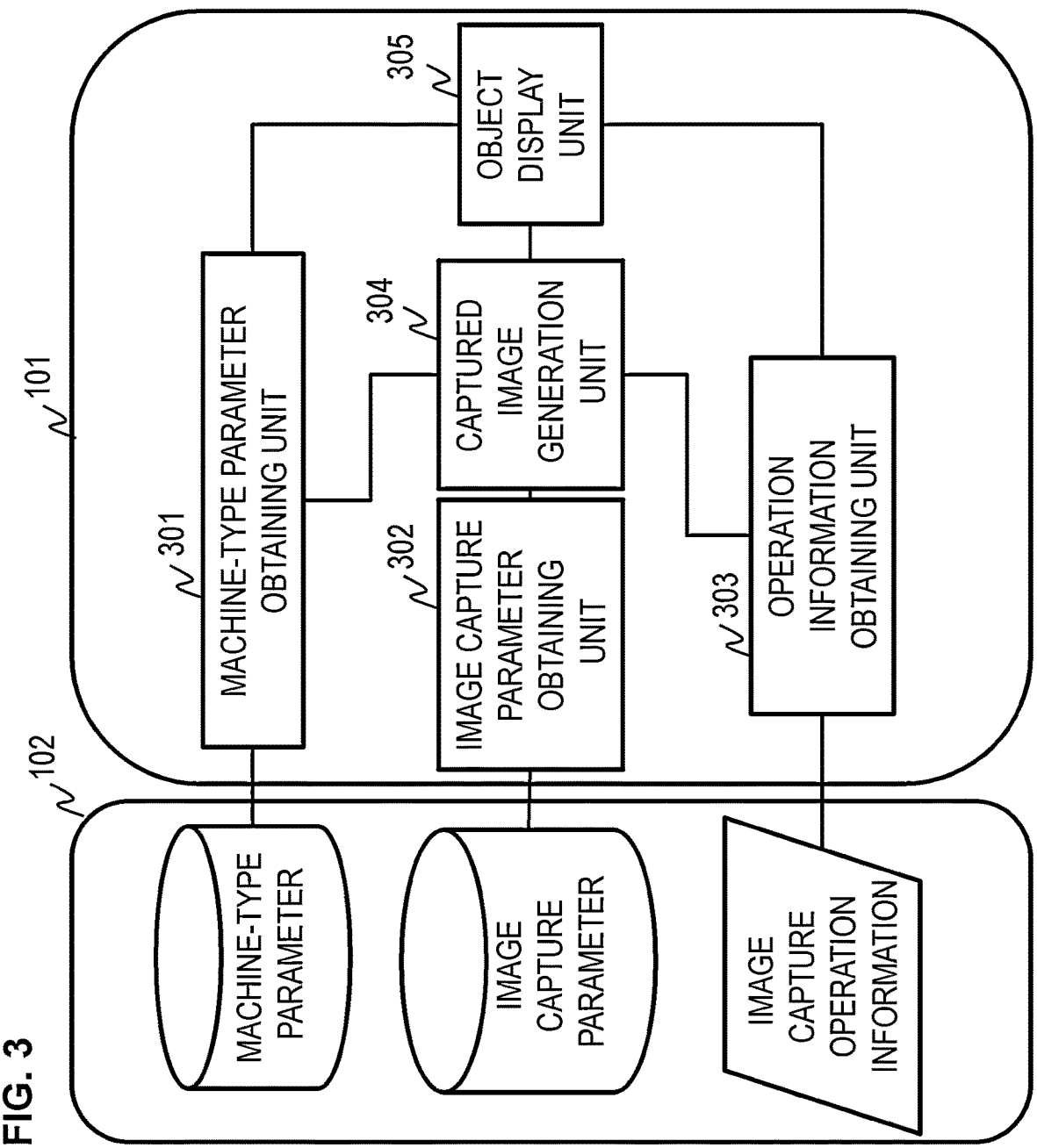
FIG. 3 is a functional block diagram of the information processing apparatus.

FIG. 3 is a functional block diagram showing a functional configuration of the information processing apparatus 101. The information processing apparatus 101 includes a machine-type parameter obtaining unit 301, an image capture parameter obtaining unit 302, an operation information obtaining unit 303, a captured image generation unit 304, and an object display unit 305.

The machine-type parameter obtaining unit 301 obtains a machine-type parameter held by the image capture apparatus 102.

FIG. 4 shows an example of the machine-type parameter. Note that the image capture apparatus 102 includes a main body (device that includes an image processing circuit and the like) and one or more members connected to the main body. In view of this, the machine-type parameter includes information regarding hardware related to the image capture apparatus 102 (information regarding the model number of the main body of the image capture apparatus 102 and information regarding the model number of a lens that is mounted to the main body of the image capture apparatus 102). The machine-type parameter may include information regarding a member that is electrically connected to the main body of the image capture apparatus 102, and whose model number is identifiable (a mount adaptor, a strobe, a grip, an extended viewfinder, or the like). The machine-type parameter is machine-type-specific information that cannot be changed by the user.

The image capture parameter obtaining unit 302 obtains image capture parameters held by the image capture apparatus 102.

FIG. 5 shows an example of the image capture parameters. The image capture parameters are information regarding image capturing set in the image capture apparatus 102 (information such as an aperture value, a shutter speed, ISO sensitivity, an exposure correction value, a lens focal length, white balance, and an image capture mode). In other words, the image capture parameters are information that can be changed by the user in order to perform image capturing.

The operation information obtaining unit 303 obtains image capture operation information of the image capture apparatus 102. The image capture operation information is temporary information that is generated by the image capture apparatus 102 when an operation event occurs (when an operation is performed by the user). The image capture operation information is not stored in a data store. When an operation event occurs in the image capture apparatus 102 and the operation information obtaining unit 303 is notified of the occurrence of the event, for example, the operation information obtaining unit 303 obtains the image capture operation information from the image capture apparatus 102. The operation information obtaining unit 303 may obtain the image capture operation information by performing polling on the image capture apparatus 102 at a fixed time interval.

FIG. 6 shows image capture operation information 601 to 605 as an example of the image capture operation information. The image capture operation information 601 indicates that the menu button has been changed to ON. The image capture operation information 602 indicates that a main electric dial has been rotated by three positions (scale marks). The image capture operation information 603 indicates that a UI component "menu 3" on the touch panel has been touched. The image capture operation information 604 indicates that the focal length of the zoom ring has decreased by 60. The image capture operation information 605 indicates that "the position of the image capture apparatus 102 detected by the sensor 214 is (x, y, z)=(0, 0, 160), and the orientation thereof is (yaw, pitch, roll)=(0, 0, 0).

Positional orientation indicated by the image capture operation information is based on any positional orientation in reality space, and is thus used after being converted into positional orientation of the image capture apparatus 102 relative to the information processing apparatus 101. An operation type of the image capture operation information is related to an operation performed on the button, an operation performed on the dial, or an operation performed on the touch panel, for example. An operation type of the image capture operation information is related to a focus operation (operation for controlling focus), a zoom operation (operation for controlling zoom), an aperture operation (operation for controlling aperture), or a positional orientation operation (operation for controlling position and orientation), for example.

The captured image generation unit 304 generates a captured image (a still image or a moving image in which virtual space is captured) of virtual space (virtual space that is experienced by the user wearing the information processing apparatus 101). The machine-type parameter, the image capture parameters, and the image capture operation information are used for generating a captured image.

The captured image generation unit 304 reflects image-capturing performance of the image capture apparatus 102 (zoomable magnification, a type of lens that is mounted, image quality in accordance with which image capturing can be performed, or the like) on performance related to image capturing of the virtual object 106, based on the machine-type parameter, as shown in FIG. 1. In addition, the captured image generation unit 304 performs adjustment such that image capturing of the virtual space can be executed from positional orientation of the virtual object 106 based on setting information indicated by the image capture parameters. Furthermore, the captured image generation unit 304 performs control of positional orientation of the virtual object 106, control of a display plane of the virtual object 106, further adjustment of the above setting information, or the like, based on the image capture operation information. The captured image generation unit 304 generates a captured image in accordance with a result of performing control using the machine-type parameter, the image capture parameters, and the image capture operation information.

The object display unit 305 is a generation unit that generates the virtual object 106 of the image capture apparatus 102 (an image capture apparatus having the same appearance as the image capture apparatus 102), and is a display control unit that controls the display unit 208 to display the virtual object 106. Specifically, the object display unit 305 displays the virtual object 106 of the image capture apparatus 102, in the virtual space that is being experienced by the user wearing the information processing apparatus 101. The machine-type parameter and the image capture operation information are used for displaying the virtual object 106. In addition, the object display unit 305 uses a captured image generated by the captured image generation unit 304, as a texture that is displayed in a portion of the virtual object 106.

The object display unit 305 reflects the appearance (size, shape, colors, patterns, and the like) of the image capture apparatus 102 on the appearance of the virtual object 106 based on the machine-type parameter, as shown in FIG. 1. The object display unit 305 performs control of the positional orientation of the virtual object 106, the display plane of the virtual object 106, and the like, based on the image capture operation information, for example.

Note that, in a case where a certain operation is performed on the image capture apparatus 102 at a time of image capturing of virtual space, processing similar to processing that is performed in a case where the certain operation is performed on the image capture apparatus at a time of image capturing of reality space is performed. When the image capture apparatus 102 captures an image of the reality space, and an exposure correction button of the image capture apparatus 102 is pressed, the image capture apparatus 102 performs exposure correction related to image capturing of the reality space in accordance with the image capture operation information and the like. On the other hand, when an image of the virtual space is captured and the exposure correction button of the image capture apparatus 102 is pressed, a processing unit performs exposure correction related to image capturing of the virtual space in accordance with the image capture operation information and the like. Here, the processing unit is a functional unit that executes processing that is based on operations of the captured image generation unit 304, the object display unit 305, and the like.

Figure 7:
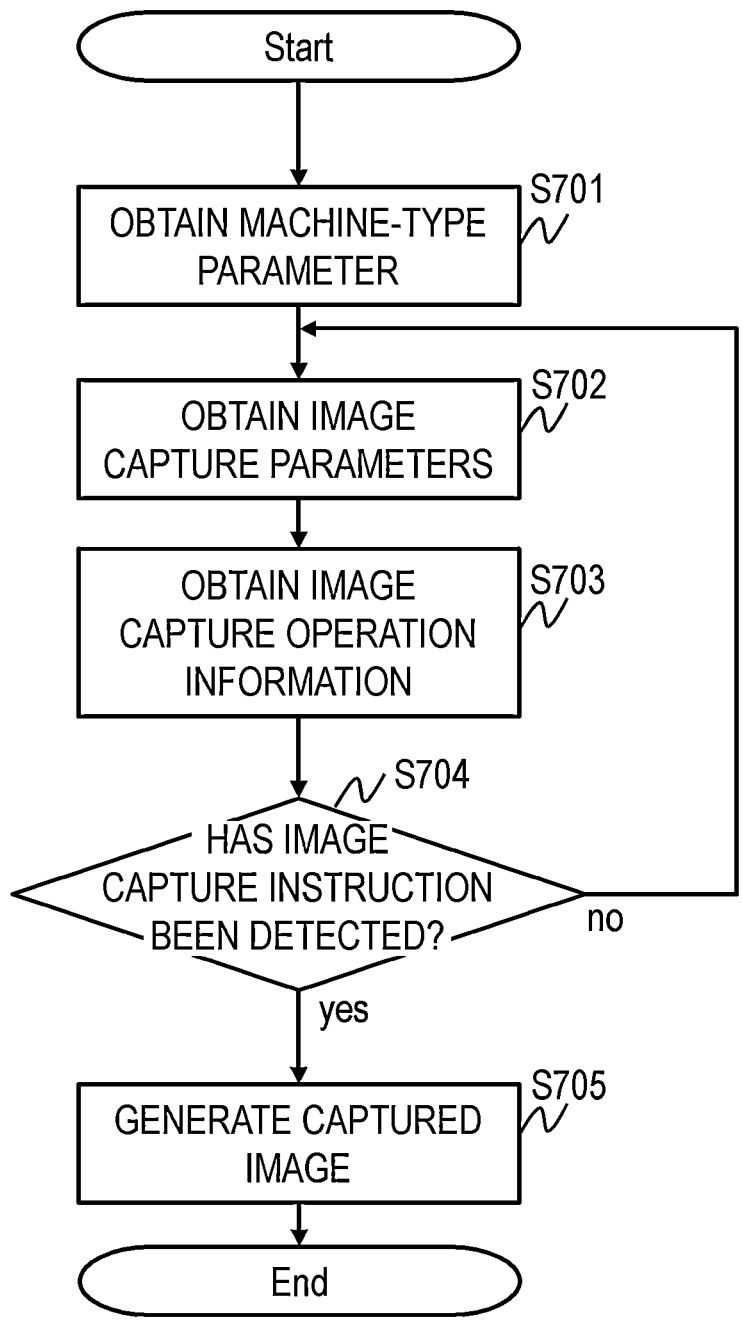
FIG. 7 is a flowchart of processing for generating an image of virtual space.

Generation of a captured image in the virtual space will be described below with reference to the flowchart in FIG. 7.

In step S701, the machine-type parameter obtaining unit 301 obtains the machine-type parameter of the image capture apparatus 102. The machine-type parameter obtaining unit 301 stores the machine-type parameter of the image capture apparatus 102 as internal information of the information processing apparatus 101. The machine-type parameter of the image capture apparatus 102 is obtained only one time when the information processing apparatus 101 and the image capture apparatus 102 are connected.

In step S702, the image capture parameter obtaining unit 302 obtains the image capture parameters of the image capture apparatus 102. The image capture parameter obtaining unit 302 stores the image capture parameters of the image capture apparatus 102 as internal information of the information processing apparatus 101. When information regarding previously stored image capture parameters are stored, the image capture parameter obtaining unit 302 overwrites the information with the new image capture parameters, and stores the information.

In step S703, the operation information obtaining unit 303 obtains the image capture operation information of the image capture apparatus 102. The operation information obtaining unit 303 stores the image capture operation information of the image capture apparatus 102 as internal information of the information processing apparatus 101. The obtained image capture operation information is accumulated through queuing until processing that is based on the image capture operation information is executed.

In step S704, the captured image generation unit 304 refers to the image capture operation information obtained in step S703, and determines whether or not an image capture instruction has been detected (an image capture instruction has been given by the user). If it is determined that an image capture instruction has been detected, the procedure advances to step S705. If it is determined that an image capture instruction has not been detected, the procedure returns to step S702.

In step S705, the captured image generation unit 304 generates a captured image (image in which the virtual space is captured) based on the machine-type parameter, the image capture parameters, and the image capture operation information. That is to say, an image in which the virtual space is captured is obtained from positional orientation of the virtual object 106 of the image capture apparatus 102.

Figure 9:
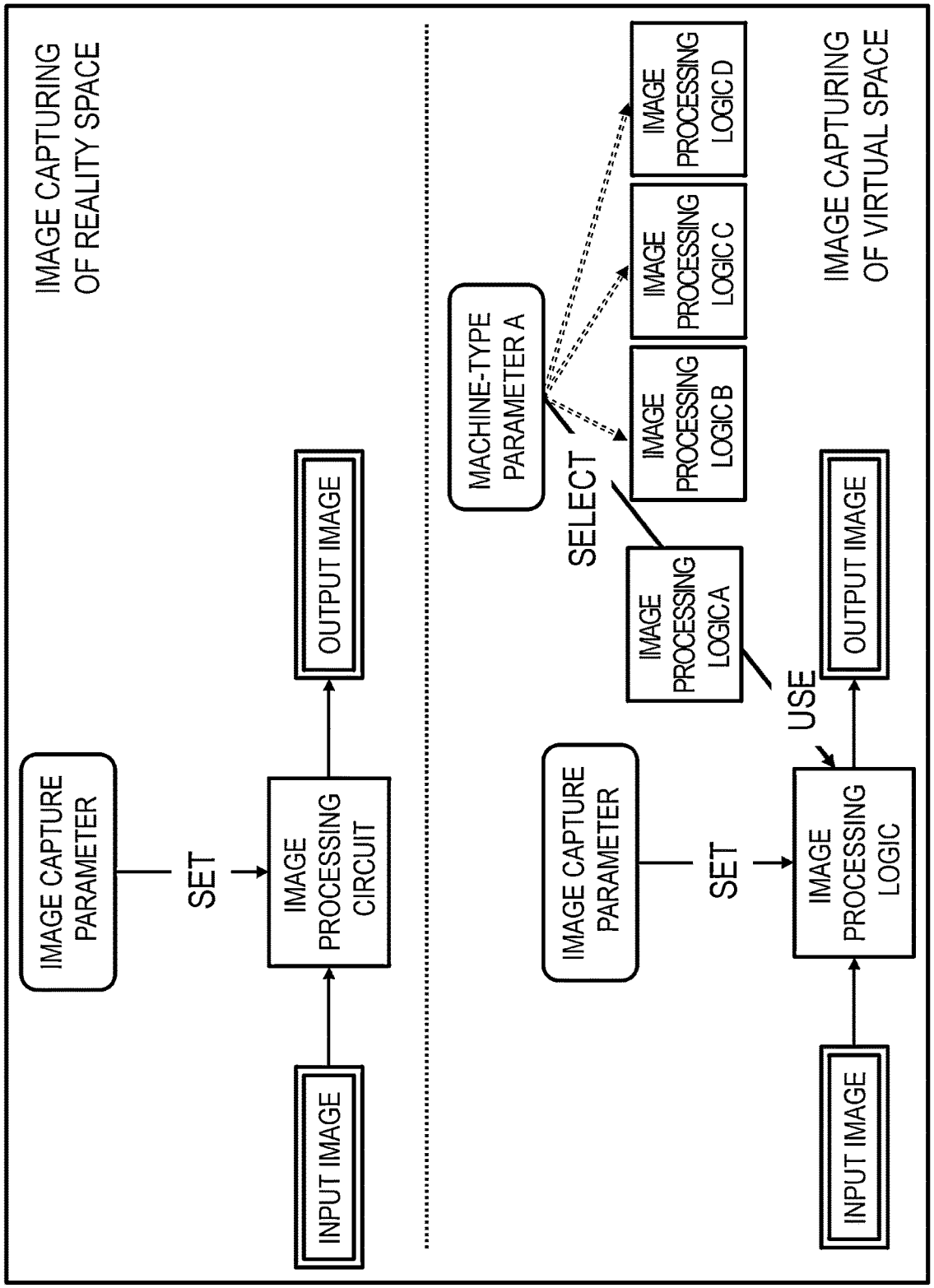
FIG. 9 is a diagram illustrating image capturing of reality space and image capturing of virtual space.

As shown in FIG. 9, in image capturing of reality space, image capture parameters are set in the image processing circuit of the image capture apparatus. The image processing circuit then executes processing that is based on the image capture parameters, on an input image obtained from an image sensor, and generates an output image. As a result, the image processing circuit realizes image capturing of the reality space.

On the other hand, in image capturing of virtual space according to the first embodiment, image capture parameters are set for an image processing logic (image processing program) that is executed by the information processing apparatus 101. In view of this, an image processing logic (software that regenerates an image processing circuit) is stored in the recording unit 206 of the information processing apparatus 101, for each machine type (machine-type parameter) of image capture apparatus, as software (program) that realizes processing of the image processing circuit of the image capture apparatus. For this reason, in step S705, the captured image generation unit 304 selects an optimum image processing logic corresponding to the image processing apparatus of the image capture apparatus 102, from a plurality of image processing logics, using the machine-type parameter as a key (search key). The captured image generation unit 304 can perform simulation of movement of the image processing circuit when image capture parameters are applied, in consideration of optical and physical environmental conditions of the virtual space, by using the selected image processing logic. Through this simulation, the captured image generation unit 304 generates an output image (captured image) based on an input image (image captured based on default settings of the virtual space).

Figure 10:
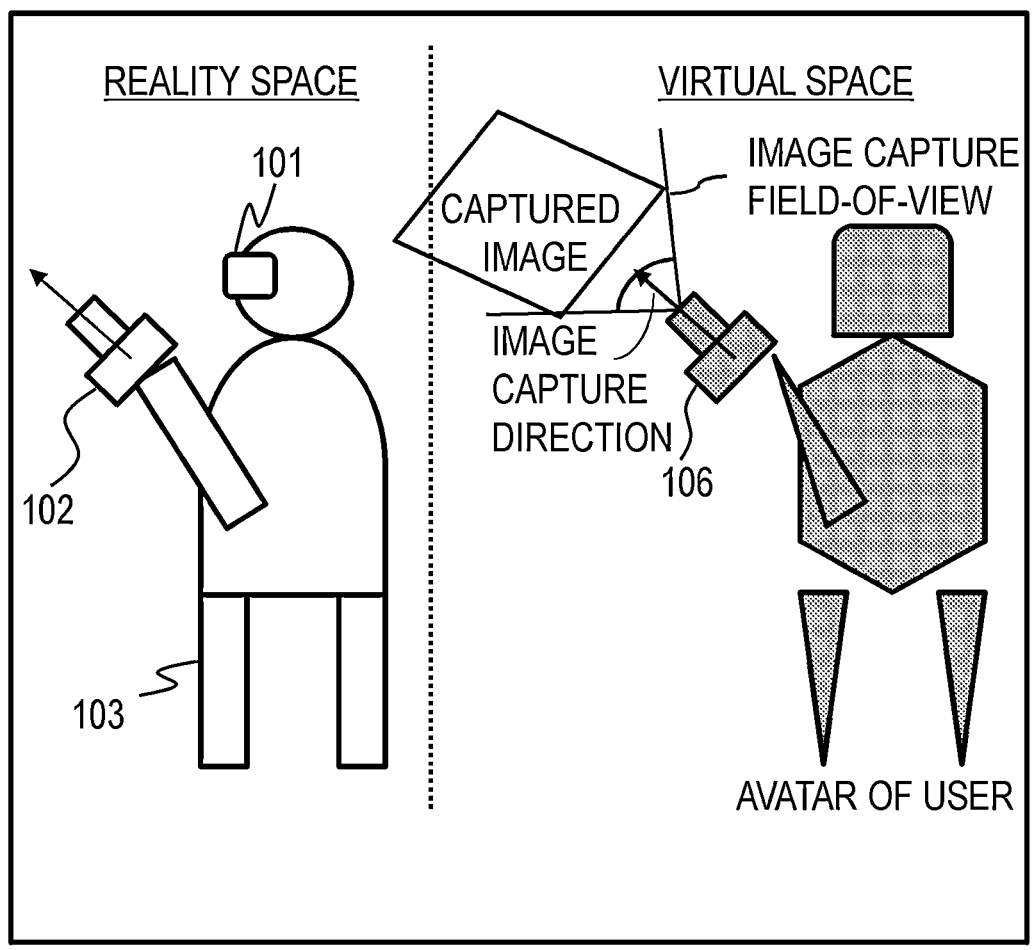
FIG. 10 is a diagram illustrating an image capture direction and an image capture field-of-view.

As shown in FIG. 10, the positional orientation of the real-life image capture apparatus 102 is reflected on the virtual object 106 of the image capture apparatus 102 in the virtual space as is, and thus an image capture direction can be uniquely determined. Note that the image capture operation information includes operation information of positional orientation of the image capture apparatus 102. An image capture field-of-view is determined on the basis of the focal length of a lens that is included in the image capture parameters, the aperture value, and the like. As a result of the image capture direction and the image capture field-of-view being determined, an area of the virtual space that is extracted as a captured image can be determined.

A captured image generated by the captured image generation unit 304 (image in which the virtual space is captured) is recorded in the recording unit 206 of the information processing apparatus 101.

Figure 8:
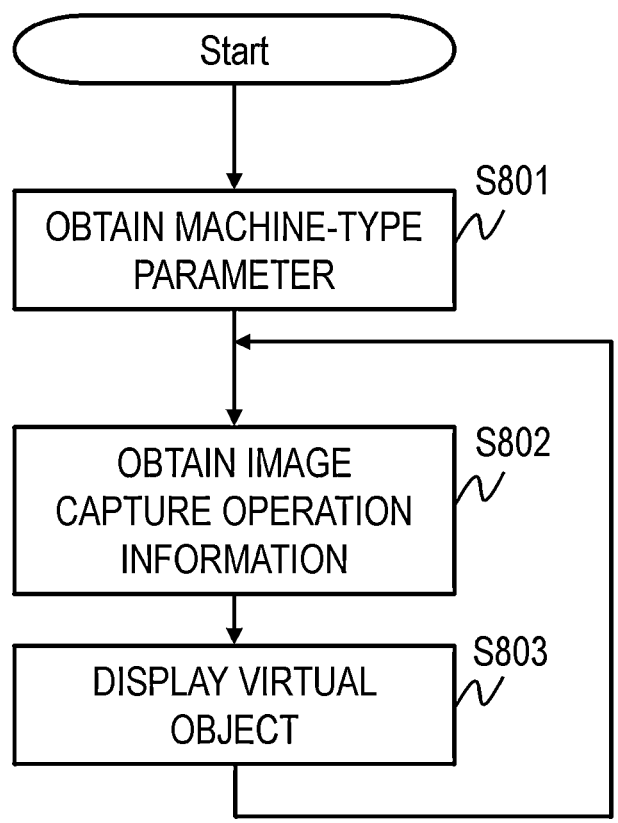
FIG. 8 is a flowchart of display of a virtual object.

Display of the virtual object of the image capture apparatus 102 in the virtual space will be described below with reference to the flowchart in FIG. 8. Processing in the flowchart in FIG. 8 is executed in parallel with processing in the flowchart in FIG. 7 (at the same time).

In step S801, the machine-type parameter obtaining unit 301 obtains the machine-type parameter of the image capture apparatus 102. The machine-type parameter obtaining unit 301 stores the machine-type parameter of the image capture apparatus 102 as internal information of the information processing apparatus 101. Only one time when the information processing apparatus 101 and the image capture apparatus 102 are connected, the machine-type parameter obtaining unit 301 obtains the machine-type parameter of the image capture apparatus 102.

In step S802, the operation information obtaining unit 303 obtains the image capture operation information of the image capture apparatus 102. The operation information obtaining unit 303 stores the image capture operation information of the image capture apparatus 102 as internal information of the information processing apparatus 101. The obtained image capture operation information is accumulated through queuing until processing that is based on the image capture operation information is executed.

In step S803, the object display unit 305 generates the virtual object 106 of the image capture apparatus 102 based on the machine-type parameter obtained in step S801 and the image capture operation information obtained in step S802. The object display unit 305 then displays the virtual object 106 on the display unit 208. Here, the machine-type parameter is used in order to perform determination on the appearance of the virtual object 106 (appearance of virtual objects of the main body and the lens of the image capture apparatus 102). The correspondence relation between the machine-type parameter and the virtual object is stored in the information processing apparatus 101. Information regarding the positional orientation of the image capture apparatus 102 out of the image capture operation information is used in order to determine the positional orientation of the virtual object 106.

There are cases where the image capture apparatus 102 has a function to realize live view display (function for displaying a captured image of space in real time). In this case, as with the eyesight video image 104 shown in FIG. 1, a captured image generated in accordance with the flowchart in FIG. 7 may be pasted as a texture onto a display plane (live view part) of the virtual object 106. In this case, instead of a captured image being generated when an image capture instruction is detected in step S704 in the flowchart in FIG. 7, a captured image is periodically generated in a cycle in which an image that is displayed on the display unit 208 of the information processing apparatus 101 is updated.

Note that processing in the flowchart in FIG. 8 ends due to the power supply being switched off or interruption of processing end.

According to the above description, the machine-type parameter, the image capture parameters, and the image capture operation information of the image capture apparatus 102 are used for image capturing of the virtual space. For this reason, image capturing of the virtual space can be realized in a similar manner to a case where the image capture apparatus 102 performs image capturing of the reality space.

Note that the machine-type parameter, the image capture parameters, and the image capture operation information of the image capture apparatus 102 are used to generate a captured image, but other information may also be used. When the image capture apparatus 102 is a smartphone, for example, an image of the reality space may be automatically processed (corrected) depending on a type of application that is used for image capturing. For this reason, information regarding a type of application (and settings in the application) that is used for image capturing of the reality space may also be used for generation of a captured image. The captured image generation unit 304 may obtain a captured image subjected to processing (adding a frame, enlarging the eyes of a person, thinning legs, or the like), based on information regarding a type of application, for example.

According to the present invention, image capturing similar to image capturing in reality space can be realized in virtual space.

Although the present invention has been described above in detail based on the preferred embodiments, the present invention is not limited to these particular embodiment, and various modes without departing from gist of the present invention is also included in the present invention. Some of the above embodiments may be combined as appropriate.

In addition, in the above description, "if A is larger than or equal to B, the procedure advances to step S1, and if A is smaller (lower) than B, the procedure advances to step S2" may also be expressed as "if A is larger (higher) than B, the procedure advances to step S1, and, if A is smaller than or equal to B, the procedure advances to step S2". Conversely, "if A is larger (higher) than B, the procedure advances to step S1, and, if A is smaller than or equal to B, the procedure advances to step S2" may also be expressed as "if A is larger than or equal to B, the procedure advances to step S1, and, if A is smaller (lower) than B, the procedure advances to step S2". For this reason, as long as no contradictions arise, "larger than or equal to A" may also be expressed as "larger (higher; longer; greater in number) than A", and "smaller than or equal to A" may also be expressed as "smaller (lower; shorter; smaller in number) than A". Also, "larger (higher; longer; greater in number) than A" may also be expressed as "larger than or equal to A", and "smaller (lower; shorter; smaller in number) than A" may also be expressed as "smaller than or equal to A".

The various controls described above may or may not be performed by a single hardware (e.g., a processor or circuit). A plurality of hardware (e.g., a plurality of processors, a plurality of circuits, or a combination of one or more processors and one or more circuits) may share the processing to control the entire device.

The above processors are processors in the broadest sense and include both general purpose and specialized processors. The general-purpose processors include, for example, CPU (Central Processing Unit), MPU (Micro Processing Unit), and DSP (Digital Signal Processor). The specialized processors include, for example, GPU (Graphics Processing Unit), ASIC (Application Specific Integrated Circuit), PLD (Programmable Logic Device), etc. The programmable logic devices are, for example, FPGA (Field Programmable Gate Array), CPLD (Complex Programmable Logic Device), etc.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-080782, filed on May 16, 2023, which is hereby incorporated by reference herein in its entirety.

What is claimed is:

1. An information processing apparatus that captures an image of virtual space in which a virtual object corresponding to a first image capture apparatus that captures an image of reality space is disposed, the information processing apparatus comprising:
    at least one processor capable of causing the information processing apparatus to:
    (1) control a display to display an image of the virtual space;
    (2) obtain machine-type information and an image capture parameter of the first image capture apparatus;
    (3) obtain operation information regarding an operation performed on the first image capture apparatus by a user;
    (4) generate, as the virtual object, a second image capture apparatus having orientation and appearance corresponding to the first image capture apparatus, at a position in the virtual space that corresponds to the first image capture apparatus based on (a) the machine-type information, (b) a position of the first image capture apparatus, and (c) an orientation of the first image capture apparatus; and
    (5) generate a captured image in which the virtual space is captured from a position and an orientation of the second image capture apparatus, based on (a) the image capture parameter and (b) the operation information.

2. The information processing apparatus according to claim 1, further comprising a plurality of image processing programs,
    wherein each of the plurality of image processing programs is a program obtained by software regenerating an image processing circuit that is used for one image capture apparatus to capture an image of the reality space, and
    wherein the at least one processor is capable of causing the information processing apparatus to (1) select, from the plurality of image processing programs, an image processing program corresponding to the first image capture apparatus in accordance with the machine-type information, and (2) generate the captured image based on the selected image processing program.

3. The information processing apparatus according to claim 1, wherein the at least one processor is capable of causing the information processing apparatus to perform first processing in relation to image capturing of the virtual space in a case where the user performs a first operation on the first image capture apparatus at a time of image capturing of the virtual space, and
    wherein in a case where the user performs the first operation on the first image capture apparatus at a time of image capturing of the reality space, the first image capture apparatus performs the first processing in relation to image capturing of the reality space.

4. The information processing apparatus according to claim 1, wherein the first image capture apparatus is a single-lens reflex camera, a mirrorless camera, a digital camera, an action camera, a drone, or a smartphone.

5. The information processing apparatus according to claim 1, wherein the machine-type information is information regarding a model number of a main body of the first image capture apparatus or information regarding a model number of a member that is mounted to the main body of the first image capture apparatus.

6. The information processing apparatus according to claim 5, wherein the member that is mounted to the main body of the first image capture apparatus is a lens, a mount adaptor, a strobe, a grip, or an extended viewfinder.

7. The information processing apparatus according to claim 1, wherein the image capture parameter includes at least one of parameters of an aperture value, a shutter speed, ISO sensitivity, an exposure correction value, a lens focal length, white balance, and an image capture mode.

8. The information processing apparatus according to claim 1, wherein the operation information is information regarding at least one of an operation performed on a button, an operation performed on a dial, and an operation performed on a touch panel.

9. The information processing apparatus according to claim 1, wherein the operation information is information regarding an operation related to at least one of control of focus, control of zoom, control of aperture, and control of position and orientation.

10. The information processing apparatus according to claim 1, wherein the captured image is a still image or a moving image.

11. The information processing apparatus according to claim 1, wherein the image of the virtual space includes the second image capture apparatus and the captured image.

12. The information processing apparatus according to claim 1, wherein the captured image is pasted onto a display plane of the second image capture apparatus.

13. An information processing method for capturing an image of virtual space in which a virtual object corresponding to a first image capture apparatus that captures an image of reality space is disposed, the method comprising:
controlling a display to display an image of the virtual space;
obtaining machine-type information and an image capture parameter of the first image capture apparatus;
obtaining operation information regarding an operation performed on the first image capture apparatus by a user; and
generating, as the virtual object, a second image capture apparatus having orientation and appearance corresponding to the first image capture apparatus, at a position in the virtual space that corresponds to the first image capture apparatus based on (a) the machine-type information, (b) a position of the first image capture apparatus, and (c) an orientation of the first image capture apparatus; and
generating a captured image in which the virtual space is captured from a position and an orientation of the second image capture apparatus, based on (a) the image capture parameter and (b) the operation information.

14. A non-transitory computer-readable medium that stores a program, wherein the program causes a computer to execute an information processing method for capturing an image of virtual space in which a virtual object corresponding to a first image capture apparatus that captures an image of reality space is disposed, the method comprising:
controlling a display to display an image of the virtual space;
obtaining machine-type information and an image capture parameter of the first image capture apparatus;
obtaining operation information regarding an operation performed on the first image capture apparatus by a user;
generating, as the virtual object, a second image capture apparatus having orientation and appearance corresponding to the first image capture apparatus, at a position in the virtual space that corresponds to the first image capture apparatus based on (a) the machine-type information, (b) a position of the first image capture apparatus, and (c) an orientation of the first image capture apparatus; and
generating a captured image in which the virtual space is captured from a position and an orientation of the second image capture apparatus, based on (a) the image capture parameter and (b) the operation information.

* * * * *